Feb. 2, 1926.
F. VOREL
1,571,744
ENGINE VALVE AND PROCESS OF MAKING THE SAME
Filed August 13, 1921   2 Sheets-Sheet 2
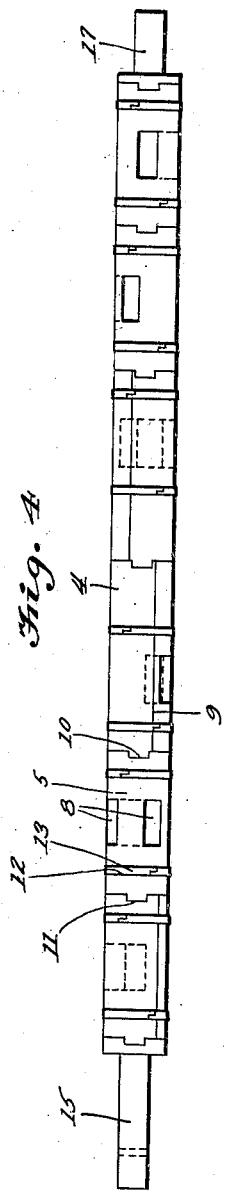
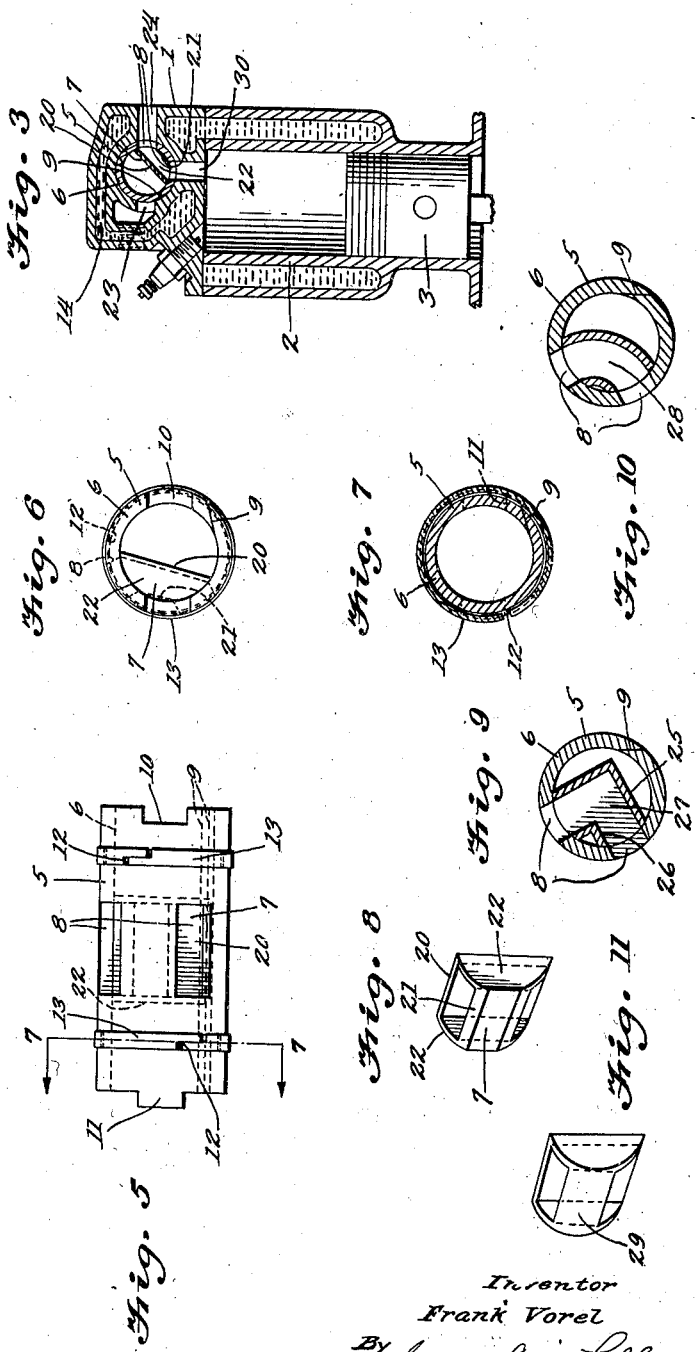
Inventor
Frank Vorel
By Gray and Lilly
Attys 1,571,744

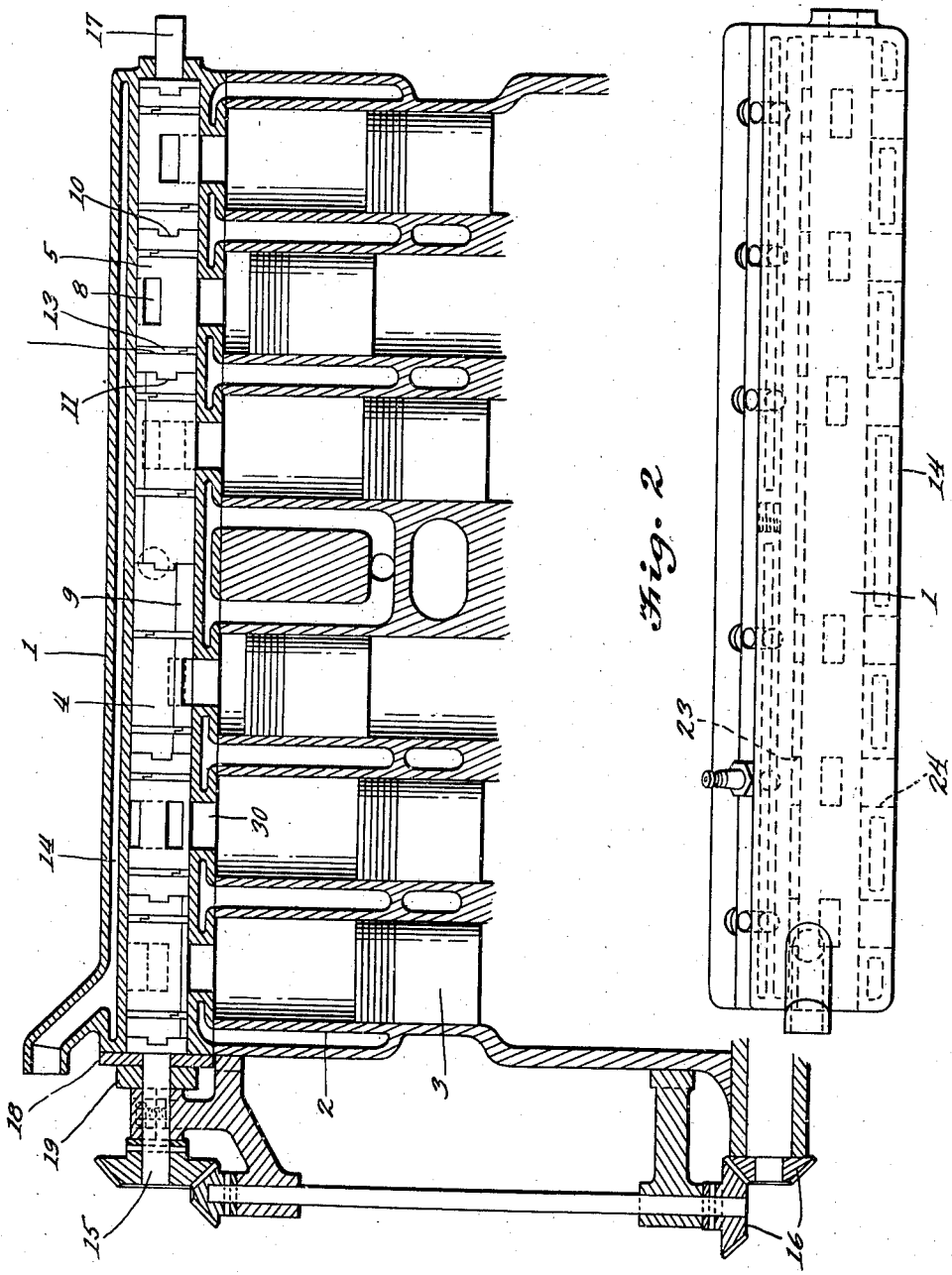

Patented Feb. 2, 1926.

UNITED STATES PATENT OFFICE.

FRANK VOREL, OF CLEVELAND, OHIO, ASSIGNOR OF ONE-HALF TO JOSEPH E. MORAVEC, OF CLEVELAND, OHIO.

ENGINE VALVE AND PROCESS OF MAKING THE SAME.

Application filed August 13, 1921. Serial No. 491,979.

To all whom it may concern:

Be it known that I, FRANK VOREL, a resident of Cleveland, in the county of Cuyahoga and State of Ohio, and a citizen of the United States, have invented certain new and useful Improvements in Engine Valves and Processes of Making the Same, of which the following is a specification.

This invention relates to engine valves, and the method of making the same, and especially to valves for gas engines and has for an object to provide an improved rotary valve to be employed in connection with multi-cylinder internal combustion engines.

A further object of this invention is to provide a sectional rotary valve having a separate section for controlling each cylinder, the several sections having means for keying them together at their adjacent ends, so that slight distortion of one section will not affect the others in the least.

A further object of this invention is to discover a method of making a hollow valve section having a valve element secured to the inner walls of the section and providing a suitable channel for gases.

A further object is to provide a hollow composite rotary valve whose valve channels are provided by tube or pipe sections securred rigidly to the inner walls thereof.

A further object is to mount the rotary valve in the casing above the cylinders by providing it with rings which are sprung into peripheral slots in the valve and are held stationary with the casing.

A still further object is to provide the said composite rotary valve with a common longitudinal peripheral slit for all sections to permit slight independent expansion of the said sections under the influence of heat.

These and other objects I attain by means of a construction embodying the features herein described and illustrated in the drawings accompanying and forming a part of this application.

In the drawings, Fig. 1 is a vertical longitudinal section through the upper part of a multi-cylinder engine embodying the improvements.

Figure 2 is a plan view.

Figure 3 is a vertical transverse section through one of the cylinders the piston being shown in elevation.

Fig. 4 is a side elevation of the rotary valve shaft.

Fig. 5 is a side elevation of a single valve section on a somewhat larger scale.

Fig. 6 is an end elevation of a valve section.

Fig. 7 is a transverse section taken on the line 7—7 of Fig. 5.

Fig. 8 is a perspective view of the valve channel tube before insertion in the rotary section, and Figs. 9, 10 and 11 are cross sections of a valve showing modifications.

In the improvement illustrated, the rotary valve shaft 4 is mounted in a water-cooled casing 1, above alined cylinders 2 carrying pistons 3. The construction shown embodies an internal combustion engine of the four-cycle type and having six cylinders, though it is to be understood that any number of cylinders may well be used with this valve, and the latter may well be adapted to the two-cycle type. The said shaft is composed of cylindrical sections 5, one for each cylinder. These sections are all hollow so that the composite shaft is a continuous cylinder. The valve channels and openings in the sections are formed by first providing a tubular boxing or pipe one form of which is designated 7 (shown in Figure 8) which has flat faces 20 and 21, and sectors for its ends 22, the latter having curved sides as shown. These tubes are inserted in the sections and welded to the thin walls 6 of the same so that the openings of the tubes register with suitably arranged apertures 8 in the section walls. In their final position in the sections the parallel faces 20 and 21 will be cutting planes of the walls of the section. The passage of the gases through the valve sections will therefore be confined to the channels formed by these tubes.

A modified form of the tubing to be inserted in the section is shown in Figure 9, where the faces 20 and 21 of the other tube above described are displaced by angular walls 25 and 26, resulting in a right-angular passage 27 opening at the ports 8 of the section as in the preferred form of valve. These angular tubes may be welded to the interior wall of the section as in the other case.

The several valve sections will be keyed together by suitable slots 10 and keys 11 provided at their ends, the key of one section entering the slot of the next. The section at the gear end of the engine will register with a key on the end of a shaft bearing unit 15, while the slot at the end of the section at the extreme opposite end fits a key on the shaft end 17.

It is to be noted that each valve section is split by a longitudinal slit 9 as shown to permit slight expansion or contraction of the section walls under varying internal pressure by reason of changing temperature. These sections are accurately held in proper position in the common bore of the casing by provision of peripheral grooves 12 in which split rings 13 fit nicely, the latter being normally sprung outward against the walls of the casing and so held stationary therewith. The outwardly sprung relation of the rings to the section is shown in Figures 5 to 7. They are pressed into the groove when the sections are to be inserted into the bore of the casing.

As illustrated there are six valve sections—one for each cylinder, and there are provided two peripheral grooves for each section with the two fitting split rings. One tube and a single pair of openings are provided for each cylinder section. This therefore requires that the speed of the valve shaft shall be one half that of the crank shaft. This relation is attained by gears 16 connecting the two shafts. Cooling liquid is applied to the outer casing through the channel 14 as shown.

In the operation of the mechanism the valve shaft will rotate clockwise as shown in Figure 3 of the drawings, so that the valve channel above a given cylinder will during two rotations of the crank shaft, put the cylinder and exhaust openings 30 and 24 respectively, in communication, then the intake and cylinder openings 23 and 30, in communication, then wholly close the cylinder port from communication with either the in-take or exhaust openings for a time period required for the rise and fall of the piston. The spark plugs (shown in Figs. 2 and 3) are provided for the proper explosion in accordance with this arrangement.

The form of tubing or piping shown in Fig. 8 may be manufactured by cutting a sector from a rectangular hollow tube, though other methods of making it may obviously be employed.

In some cases it may be desirable to use a curved channel 28, in the tube or piping, as shown in the form illustrated in Fig. 10. In still other instances it may be advantageous to make the tube structure with one flat face, as part 20 in Fig 8, but with a curved face 29 for direct contact with the section wall as shown in Fig. 11.

Sheet metal has been found preferable as the material for manufacturing the valve sections and pipes, copper, iron and brass being found suitable, and in some instances aluminum is very desirable Applicant is by no means restricted to such material, and the use of cast iron tubing is contemplated for the valve sections and may also be used for the valve channels pipes of Figs. 8 to 11, though other forms of cast metal may also be used and are contemplated

Having thus described my invention, what I claim as new and desire to secure by Letters Patent is:

1. A hollow valve shaft having peripheral grooves thereabout, a longitudinal slit to permit slight expansion or contraction thereof and alined apertures in its walls, tubular elements having their ends welded to the inner surface of said walls with the end openings in such elements registering with said apertures to form positively directed valve channels for the passage of gases therethrough, and yielding rings sprung into said grooves.

2. In a single rotary valve multi-cylinder gas engine a common valve casing above the cylinder heads in combination with a sectional valve shaft rotatably mounted in the bore of said casing, each section being hollow and having suitable apertures in its walls and tubular valve elements therein welded to the inner surface of the walls thereof in such position that the openings in the tubes shall register with said apertures to form positively directed valve channels for passage of the gases therethrough, all the shaft sections having a longitudinal slit to permit slight independent distortion of the sections, and means on the several sections to cause all of them to rotate together.

3. In a rotary valve multi-cylinder gas engine, a hollow cylindrical valve shaft having a longitudinal slit to permit slight expansion and contraction by uneven internal pressure and having suitable apertures in its walls and tubular valve elements therein welded to the inner surface of the walls thereof in such position that the openings in the tubes shall register with said apertures to form positively directed valve channels therethrough, the said channels having no communication whatever with the interior of the shaft.

4. In a rotary valve multi-cylinder gas engine, a cylindrical hollow valve shaft having transversely alined apertures in its walls, in combination with a tubular piping or boxing with open ends, which is welded to the inner surface of the shaft with the said ends registering with the apertures in the shaft walls to form a positively directed valve channel therethrough said piping having parallel faces which are in planes cutting the curved surfaces of the shaft and the said channel having no communication whatever with the interior of the shaft.

5. In a rotary valve multi-cylinder gas engine, cylindrical hollow valve shaft, having transversely alined apertures in its walls in combination with a tubular piping or boxing with open ends welded to the inner surface of the shaft with the said ends registering with the apertures in the shaft walls to form a positively directed valve channel therethrough, said piping having faces all of which are spaced from the shaft walls, and the said channel having no communication whatever with the interior of the shaft.

6. A hollow valve shaft having suitable apertures therein and tubular elements welded to the inner surface of its walls with openings in such elements registering with said apertures to form positively directed valve channels for passage of gases therethrough, the said channels having no communication whatever with the interior of the shaft.

7. In a sectional rotary hollow valve shaft, a hollow section having suitable apertures in its walls in combination with a hollow piping or boxing having open ends welded to the inner walls of the said section in register with said apertures to form a positively directed valve channel therethrough, the said channel having no communication whatever with the interior of the section.

8. A hollow cylindrical valve section for internal combustion engines having suitable apertures in its walls, peripheral grooves thereabout and a longitudinal slit to permit slight expansion or contraction by varying internal pressure, in combination with a hollow piping or boxing having open ends welded to the inner walls of the section in register with said apertures to form a positively directed channel therethrough, the said channel having no communication with the interior of the section, and yielding rings sprung into said grooves but normally expanded into contact with the walls of the casing enclosing the section.

9. The method of making hollow rotary metallic valve sections for internal combustion engines comprising making a split cylinder section having a cylindrical bore and two apertures in its wall in transverse alinement, providing a hollow metallic piping or boxing having parallel face walls and open ends, the said ends of the piping fitting accurately the curved inner surface of the said section and their openings having the same size and contour as the said apertures, inserting the said piping within the said section, positioning it therein with its openings registering with the apertures in the section so that said piping will provide a suitable valve channel, and welding the pipe ends gas-tight to the section wall so that the said channel will have no communication whatever with the interior of the section.

10. The method of manufacturing hollow rotary valve sections of sheet metal comprising making a split cylinder section having a cylindrical bore and apertures in its wall in transverse alinement, manufacturing a hollow piping or tubing of sheet metal with curved open ends by cutting a sector from a rectangular hollow tube whereby the curved ends of the sector fit accurately the curved inner surface of the cylinder, and the contour and size of the piping is that of the said apertures, positioning it therein with its open ends registering with the apertures in the section so that said piping will provide a valve channel, and welding the pipe ends gas-tight to the section wall so that the said channel will have no communication whatever with the interior of the section.

In testimony whereof I hereunto affix my signature.

FRANK VOREL.